US005465525A

United States Patent [19]
Mifune et al.

[11] Patent Number: 5,465,525
[45] Date of Patent: Nov. 14, 1995

[54] INTELLECTUAL WORKING ROBOT OF SELF CONTROLLING AND RUNNING

[75] Inventors: Hiroshi Mifune; Satoshi Saitoh; Teruo Kaneda, all of Tokyo; Shigetaka Tomokiyo, Matsuyama; Tsugio Adachi; Tsutomu Tanaka, both of Yamato; Toshiharu Furudate, Niza, all of Japan

[73] Assignee: Tomokiyo White Ant Co. Ltd., Ehime, Japan

[21] Appl. No.: 338,677

[22] Filed: Nov. 14, 1994

[30] Foreign Application Priority Data

Dec. 29, 1993 [JP] Japan ................................. 5-355006

[51] Int. Cl.[6] .......................... A01M 7/00; B05B 17/00; E04B 1/72
[52] U.S. Cl. ................. 43/132.1; 43/900; 901/1; 901/43; 180/167; 180/6.5
[58] Field of Search ........................... 43/132.1, 900, 43/124; 239/69, 71, 146, 172, 739, 750; 901/1, 43; 180/167, 6.2, 6.28, 6.5, 6.7

[56] References Cited

U.S. PATENT DOCUMENTS

| | | | |
|---|---|---|---|
| 5,022,812 | 6/1991 | Coughlan et al. | 901/1 X |
| 5,358,568 | 10/1994 | Okano et al. | 901/43 X |
| 5,377,913 | 1/1995 | Van Der Woude | 901/43 X |

FOREIGN PATENT DOCUMENTS 63-317034  12/1988  Japan .

Primary Examiner—Kurt Rowan
Assistant Examiner—Jeanne M. Elpel
Attorney, Agent, or Firm—Rosen, Dainow & Jacobs

[57] ABSTRACT

A robot system for exterminating termites living in wood structural members under the floor of an architectural structure. The robot system comprises a robot including an onboard computer which is electrically connected through radio communication with a host computer located outside the robot. The robot includes a main body and is equipped with a locomotive mechanism including a pair of caterpillars located on the opposite sides of the main body. The caterpillars are driven by driving motors mounted on the robot and can be independently operated. The robot includes a mechanism for controlling the vertical positions of various sections of the main body relative to the caterpillars. A nozzle mechanism for spraying chemical or insecticide and a CCD camera are mounted on the main body. The onboard computer and host computer are operatively associated with each other to control the driving motors, the vertical position controlling mechanism, the nozzle mechanism and the CCD camera.

5 Claims, 5 Drawing Sheets

INTELLECTUAL WORKING ROBOT OF SELF CONTROLLING AND RUNNING

BACKGROUND OF THE INVENTION

1. Field of the Invention

This invention relates to a robot system including an automatically operating and running small-sized robot which can spray a necessary minimum amount of chemical or insecticide onto a location at which termites are living only at wood sections under the floor of an architectural structure such as a house, particularly at structural members such as groudsills, sleepers, corner sections of walls, upon accurate confirmation by a monitor.

2. Description of Prior Art

Hitherto spraying chemical or insecticide for termites onto wood structural members has been mainly carried out manually by a person who gets under the floor. However, in this manner of spraying chemical, the person gets into a place under the floor which place is considerably small in height and sprays chemical. Such an operation is painful, dirty, dangerous owing to a long time suction of chemical. Accordingly, recently it is difficult to obtain such operators and therefore the business of such operations are difficult to continue. Additionally, such an operation is usually made by two persons and therefore relatively high personnel expenses are necessary thereby unavoidably raising cost for exterminating termites. However, consumers cannot pay a high cost frequently, and consequently the consumers expect a long term (about five years) continuing effect for exterminating termites upon one chemical spraying operation. In order to ensure such a long term continuing effect, a large amount of chemical or insecticide is required to be sprayed in the place under the floor. As a result, there are fears of residents of the house and neighbors being subjected to sanitary problems and of pollution of circumstances.

Recently, a device for spraying chemical or insecticide has been proposed as shown in Japanese Patent Provisional Publication No. 63-317034. This device includes an electric circuit having a ON-OFF switch and arranged to run but be difficult to turn around, and therefore the following difficulties have been encountered in the device, so that the device has not brought into practical use:

a) The device is of a simple ON-OFF switch operation type, and therefore an operator outside an architectural structure or house cannot accurately grasp a condition under the floor, so that the device merely sprays chemical or insecticide into the place under the floor. This requires a large amount of chemical and therefore provides not only an insanitary condition to residents but also environmental pollution to neighbors.

b) This device is not provided with an effective detecting mechanism for objective insects such as termites and an effective memory device. Accordingly, this device cannot grasp the condition under the floor at all before, during and after a chemical spraying operation, and therefore it cannot recognize a chemical spraying necessary part.

c) Although a signal representative of a trouble of the device can be received, the operation state of the device cannot be monitored and no remote control for the device cannot be made.

d) The device is arranged to spray chemical or insecticide to the ground under the floor and a concrete wall section as passages for termites. However, the device cannot spray selectively onto wood sections such as groundsills, sleepers at which termites make their harm, thereby providing an uneconomical problem.

e) The device cannot spray chemical or insecticide into corner sections under the floor to which termites tend to easily enter. This makes impossible a substantial extermination of termites.

f) The device uses flat caterpillars and therefore is difficult to turn around thereby making impossible an accurate selection for a chemical spraying place.

Thus, the above-discussed conventional device for spraying chemical has many disadvantages and problems, and therefore it is now within a region of desk plan and difficult to be brought into practical use. Additionally, the device is low in possibility of practical use.

SUMMARY OF THE INVENTION

It is an object of the present invention to provide an improved robot system for automatically accomplishing spraying chemical or insecticide to a necessary place to exterminate termites, by which drawbacks encountered in conventional techniques and devices can be effectively overcome.

Another object of the present invention is to provide an improved robot system for automatically accomplishing spraying chemical or insecticide to a necessary place to exterminate termites, by which operators or workers can be released from painful, dirty and dangerous operations made under the floor of an architectural structure or house while reducing cost for extermination of termites.

A further object of the present invention is to provide an improved robot system including a small-sized moving robot which is arranged to run under the floor and effectively spray a necessary small amount of the chemical to a required portion on a wood section under the floor thereby effectively reducing environmental pollution, under control of a computer associated with a CCD camera and a monitoring device.

A robot system of the present invention is for spraying chemical for exterminating termite, in a place under a floor of a structure and comprising a moving truck including an endless track mechanism which is able to horizontally turn, a pair of rollers operatively connected to the endless track mechanism and driven by a DC geared motor, and a main body having a tank containing the chemical and a radio circuit for outputting and inputting an electrical signal thorough radio communication. A lift mechanism is provided to be operatively connected to the main body to lift the main body relative to the endless track mechanism. The lift mechanism includes a device for changing a distance between the moving truck main body and endless track mechanism. A detecting mechanism is provided to include an encoder operatively connected to the rollers and arranged to detect a travel distance and a rotational angle of the moving truck. An automatic control mechanism is provided to include an onboard computer mounted on the moving truck main body, a host computer separate from the onboard computer, and a radio modem through which the onboard computer is electrically connected to the host computer, and arranged to automatically control operations of the moving truck. A CCD camera is mounted on the truck main body to confirm the location of the objective wood section in wood structural members under the floor. A monitoring mechanism is provided to display an image of the objective wood section. A corner section detecting device is provided to search an approach or contact of the moving truck main body to the structural members to find a corner section of the structural member. A device is provided to detect a distance between the moving truck main body and the objective wood section, and includes an infrared sensor. Additionally, an automatic operation mechanism is provided to include a device for memorizing the location and shape of the wood structural members after confirmation of all the wood structural members to which chemical is to be sprayed, and a device for accomplishing a next time spray of chemical in accordance with a memorized data derived from a preceding time spray.

The robot system of the present invention has the following features:

1) The robot or moving truck is driven through a pair of horizontally turning type caterpillars and the DC geared motors, and arranged to change the distance between the robot main body and the endless track mechanism or locomotive section upon being watched by the mechanical sensor. The robot includes the main body lift mechanism for changing the height of the main body relative to the ground, and the mechanism for detecting the travel distance and the rotational angle of the robot under the action of the encoder operatively connected to the rollers inside the endless track mechanism or caterpillarss.

2) The onboard computer in the robot main body is electrically connected with the host computer through radio modem. An automatic control mechanism is provided to accomplish an automatic control for the robot under watching of the computers. The onboard computer collects a variety of data from sensors of at various sections of the robot and receives command data from the host computer, on which a judgment is made as to whether the command from the host computer can be executed or not while repeating transmission of the command to each device and storing the locational and shape informations to a memory. The host computer receives data from the onboard computer and displays them on the display thereof and stores them in a floppy disc, while repeating the output and input of the data between it and the onboard computer. Displayed on the display of the host computer are electric source voltage, information from each sensor, the present location of the robot, the direction of the robot. In case that the reception condition is not good and there is no room in the memory, a program for a self-returning subroutine is executed.

3) It may be accomplished that the location of an object or a wood section can be confirmed by the small-sized CCD camera and a photo sensor for detecting the luminous paint attached on the wood section. The image of the object is monitored and displayed. Additionally, in order to compensate the dead area for the CCD camera or the sensor, the infrared sensors are installed at the various sections of the robot to search as to whether the robot approaches an obstacle or not. Furthermore, the robot functions to search and measure the distance between the robot main body and the object by means of the infrared sensor.

4) After the robot has sprayed the chemical on the object, the host computer confirms and memorizes the shape and location of the object by the data received from the onboard computer. At chemical sprayings at the next time or thereafter, the memorized informations at the preceding time is used thereby accomplishing automatic spraying operation of the chemical without new search of the shape and location of the object. Thus, the robot system is provided with a reproduction mechanism for the chemical spraying operation.

5) The robot may is provided with one of a surface temperature sensor for detecting a temperature of a surface of the wood structural members, an acoustic sensor for detecting sound generated by termite, and a pheromone sensor for detecting smell of pheromone, thereby searching the location at which termites are living.

Thus, according to the robot system of the present invention, the robot or moving truck can turn horizontally and automatically freely run on an endless track mechanism, spraying the chemical to necessary places. The robot can cope with a variety of complicated and uneven configurations of the ground, so that the main body is raised to adjust the distance between the main body and the endless track mechanism upon watching the condition by the mechanical sensor under driving the rollers by the geared motors, thereby changing the posture of the main body so as to adjust the height of the main body relative to the ground. By virtue of the encoders provided respectively inside the two caterpillars or endless track mechanism, the travel distance of the main body is detected by obtaining an average value of measured values, while the rotational angle of the main body is detected by obtaining a difference among measured values.

The operation of the robot is carried out by an automatic control under watching of the host computer and under radio communication through the radio modem between the onboard computer and the host computer. The onboard computer collects a variety of data from sensors of at various sections of the robot and receives command data from the host computer, on which a judgment is made as to whether the command from the host computer can be executed or not while repeating transmission of the command to each device and storing the locational and shape informations to a memory. The host computer receives data from the onboard computer and displays them on the display thereof and stores them in a floppy disc, while repeating the output and input of the data between it and the onboard computer. Displayed on the display of the host computer are electric source voltage, information from each sensor, the present location of the robot, the direction of the robot. In case that the reception condition is not good and there is no room in the memory, a program for a self-returning subroutine is executed.

The location of the object is confirmed by the image from the CCD camera attached to the main body which image is displayed and monitored. Additionally, the line of luminous paint is formed on the wood structural members, in which confirmation is made by detecting the line by the photo sensor during the chemical spraying operation. Furthermore, an obstacle located at the dead area for the CCD camera is confirmed by the infrared sensor attached to the main body of the robot, in which searching is made as to whether there is an approaching or contact between the respective sections of the main body and the obstacle, or not. Furthermore, the infrared sensor can measure the distance between the object and the main body, thereby making possible spraying of a necessary minimum amount of the chemical.

Finally, after the robot has sprayed the chemical onto the object, the host computer confirms and memorizes the shape and location of the object by the data received from the onboard computer. At the chemical spraying operations at the next time or thereafter, the memorized informations at the preceding time is used thereby accomplishing automatic spraying operation of the chemical without new search of the shape and location of the object.

The robot may be equipped with one of a surface temperature sensor for detecting a temperature of a surface of the wood structural members, an acoustic sensor for detecting sound generated by termite, and a pheromone sensor for detecting smell of pheromone, thereby searching the location at which termites are living.

DETAILED DESCRIPTION OF THE INVENTION

Figure 1:
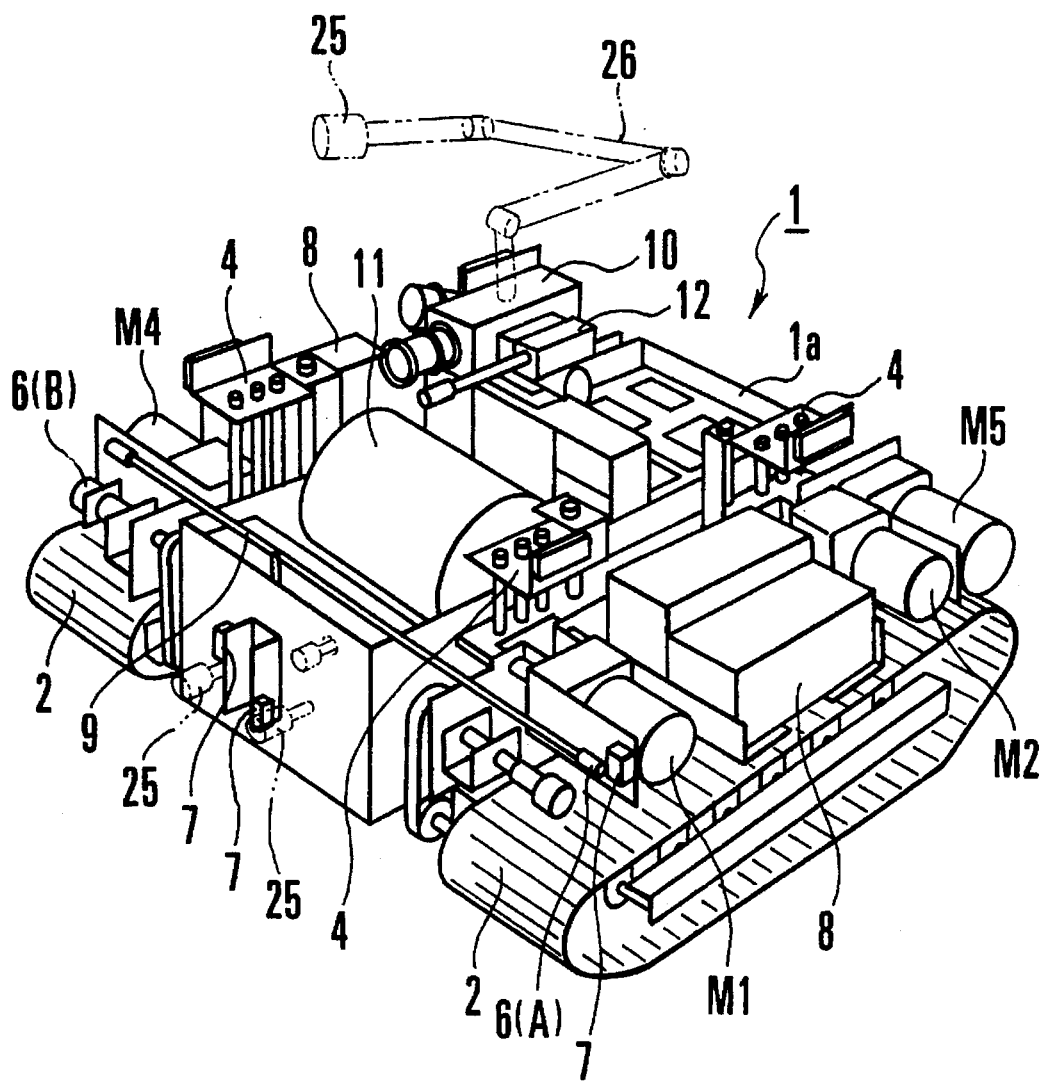
FIG. 1 is a perspective view of a robot forming part of an embodiment of a robot system according to the present invention.
Figure 2:
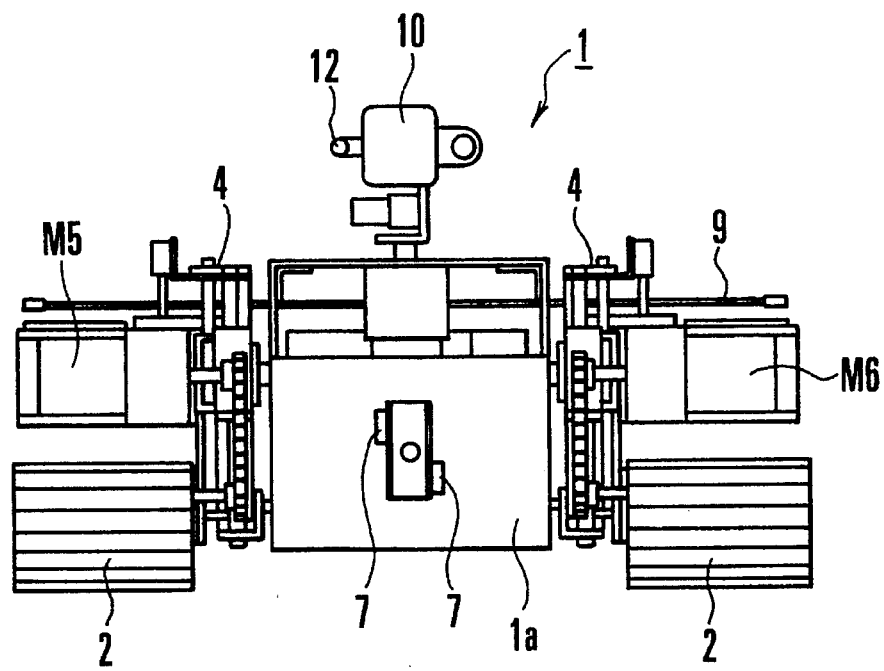
FIG. 2 is a rear elevation of the robot of FIG. 1.
Figure 3:
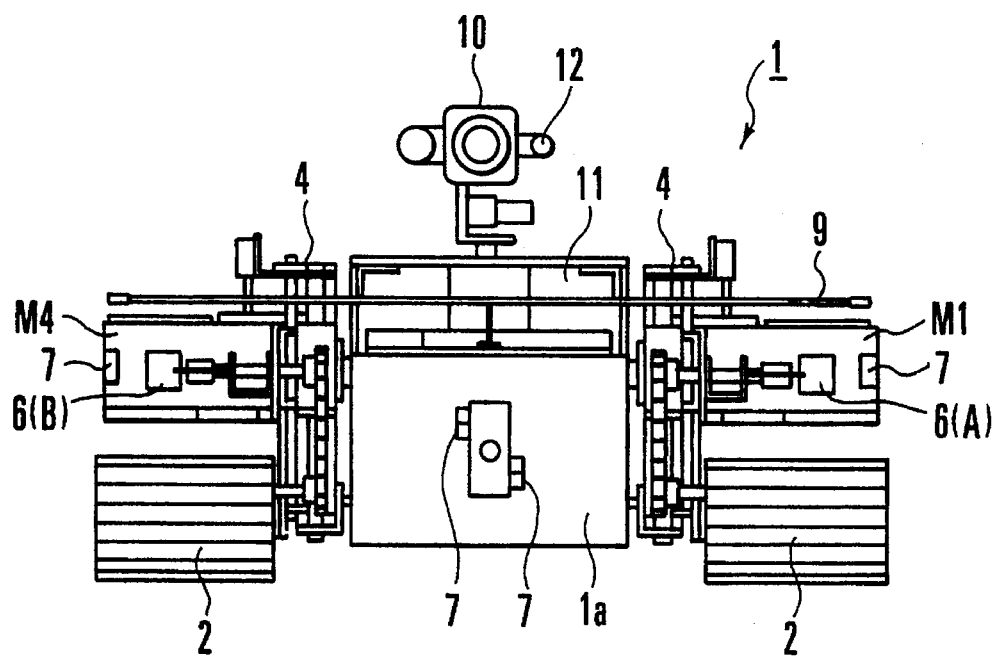
FIG. 3 is a front elevation of the robot of FIG. 1.
Figure 4:
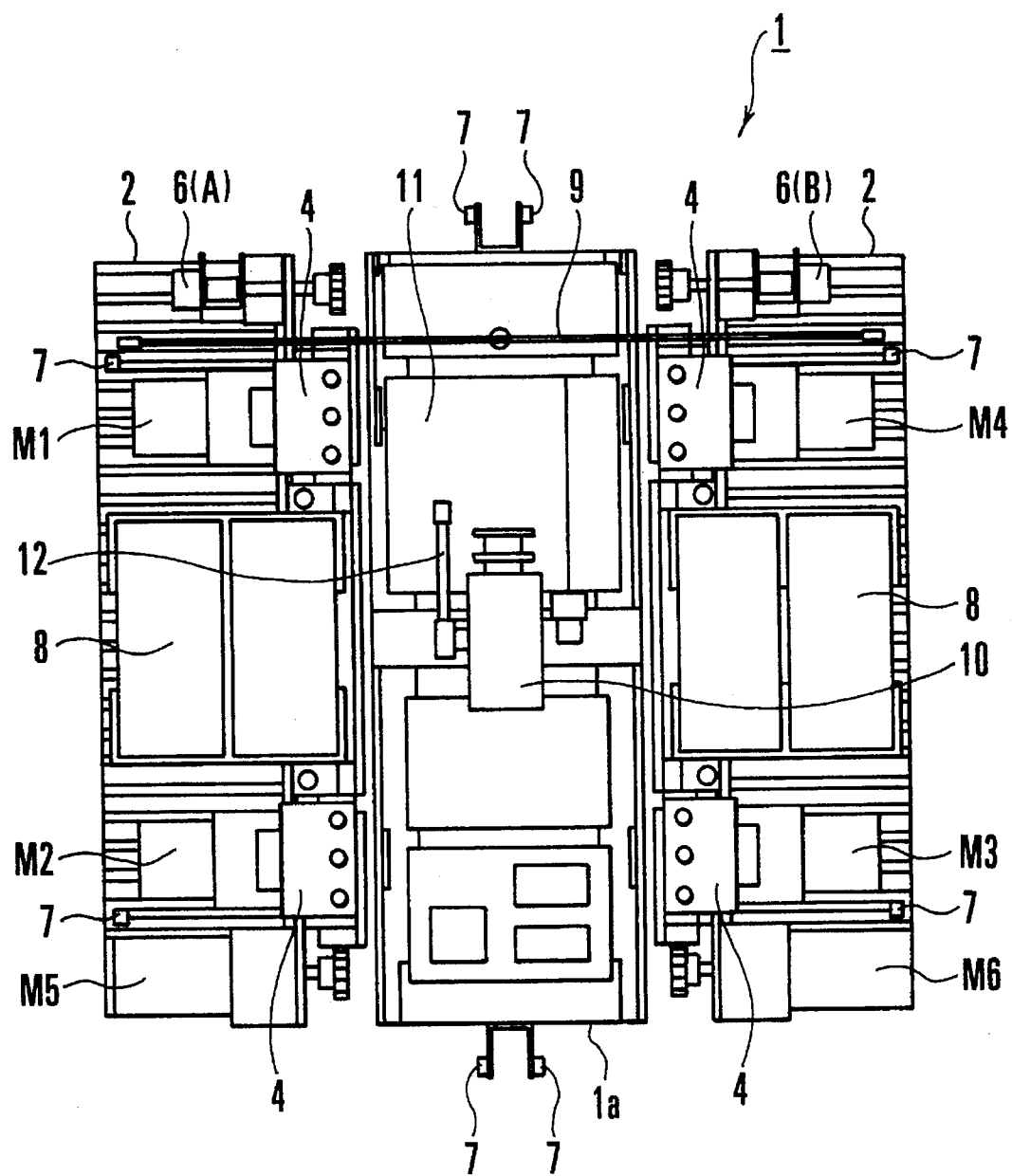
FIG. 4 is a plan view of the robot of FIG. 1.
Figure 5:
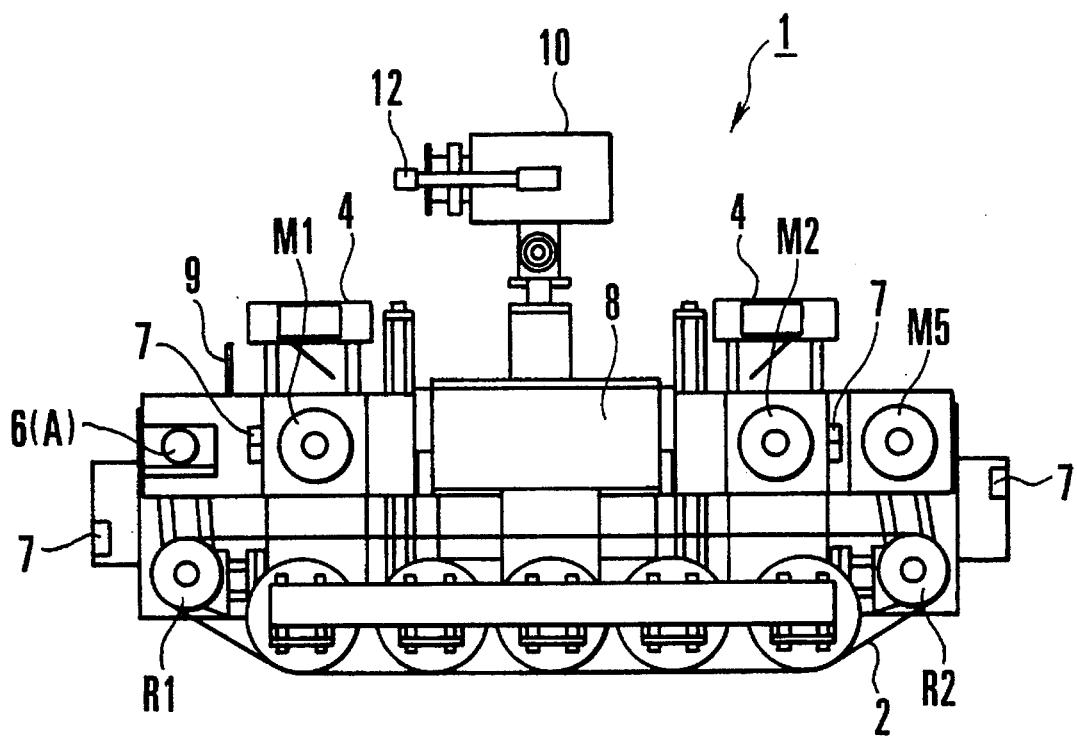
FIG. 5 is a left-side elevation of the robot of FIG. 1.
Figure 6:
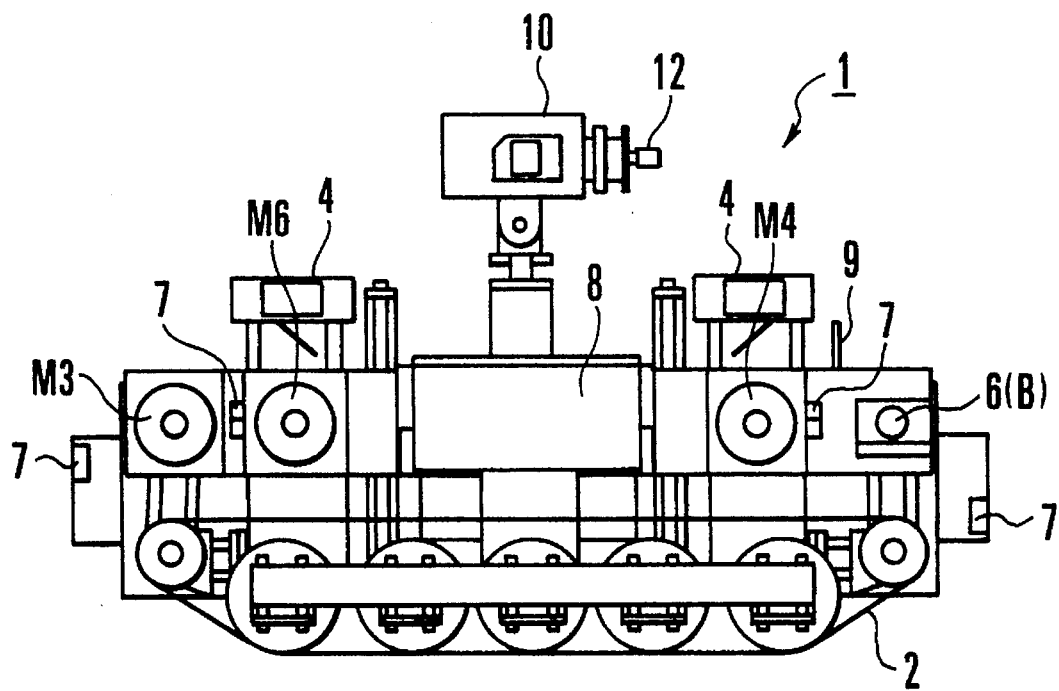
FIG. 6 is a right-side elevation of the robot of FIG. 1.
Figure 7:
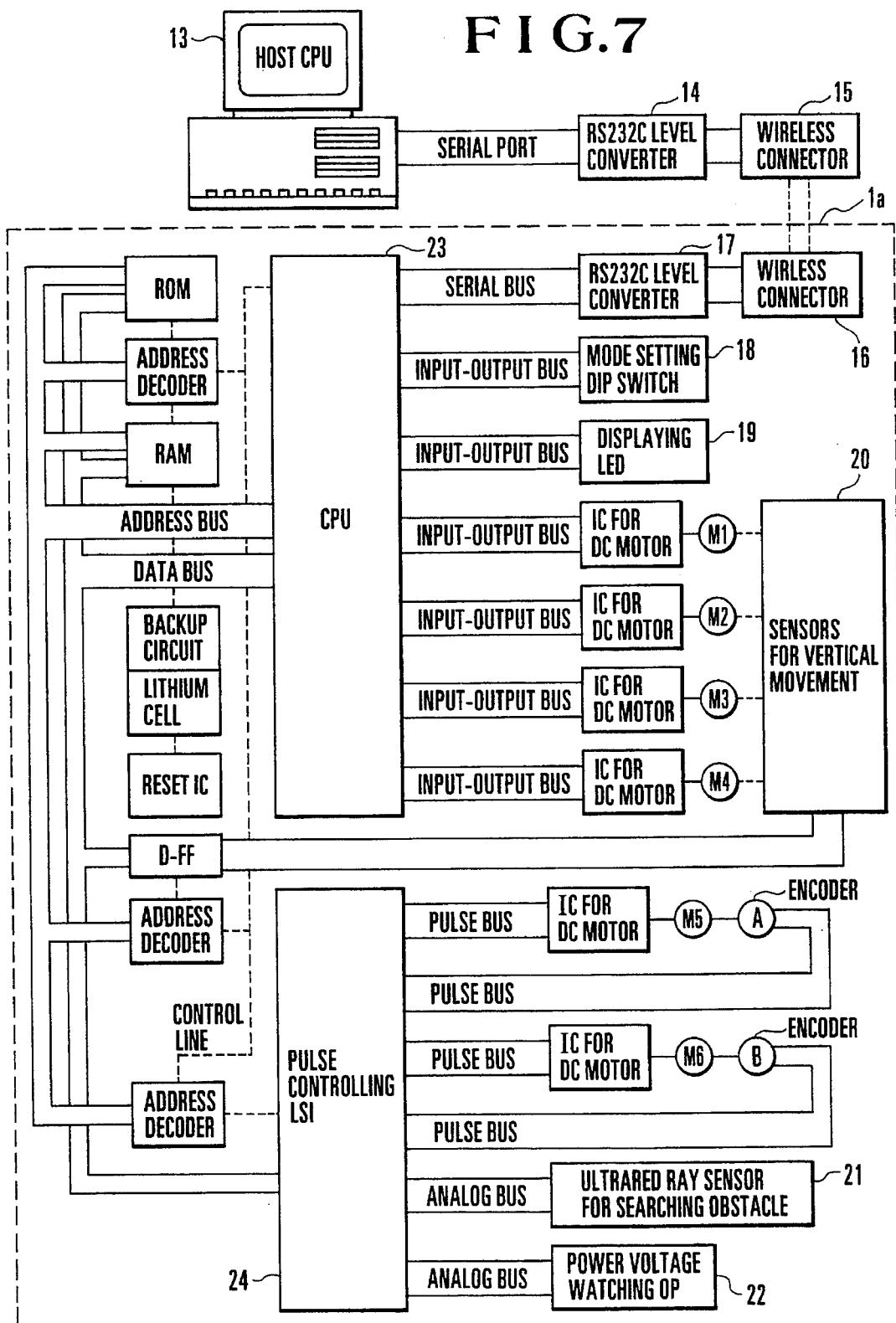
FIG. 7 is a schematic circuit diagram of a control system for the robot system of FIG. 1.

Referring now to FIGS. 1 to 7 of the drawings, a preferred embodiment of a robot system according to the present invention is illustrated. The robot system comprises a robot or moving truck 1 including a robot main body 1a. The robot main body 1a carries therein a onboard computer 23 (CPU) which is electrically connected through radio communication with a host personal computer 13 which is located separate from the robot 1. The main body 1a is mounted on a locomotive mechanism (not identified) which includes a pair of caterpillar treads or endless track mechanisms 2 which are located on the opposite sides of the robot main body 1a. Each caterpillar tread 2 is supported on a plurality of support rollers (no numerals) and driven by a pair of drive rollers or wheels R1, R2. The main body 1a carries a variety of control mechanisms and actuators electrically connected to the computer 23 as shown in FIG. 7.

The actuators of the main body 1a includes DC geared motors M5, M6 for driving the drive rollers R1, R2, and motors M1, M2, M3, M4 forming part of a mechanism for controlling the vertical location of the main body 1a relative to the locomotive mechanism. The main body 1a carries a tank (no numeral) containing therein chemical or insecticide for exterminating termite. A nozzle mechanism 12 is mounted on the main body 1a to spray the chemical from the tank under the action of an electromagnetically controlled pump 11. The nozzle mechanism 12 and the pump 11 are electrically connected to the computer 23. A CCD camera is also mounted on the main body 1a and electrically connected to the computer 23. An antenna 9 is provided on the main body 1a to electrically connect the computer 23 to the host computer 13 through radio communication. The robot 1 is constructed and arranged to run in a place under the floor of an architectural structure or house and to spray the chemical onto structural members of the architectural structure which is located under the floor and formed of wood, under control of the onboard computer 23 and/or the host computer 13.

Operation and detailed arrangement of the robot system of the present invention will be discussed with reference to FIGS. 1 to 7.

First, a charged lead battery 8 is set or installed to the robot 1. Then, a switch for the onboard computer mounted on the robot 1 is turned ON to start the operation of the computer. Then, switches for the motors are turned ON to start the operation of the actuators for a variety of operating devices mounted on the robot 1. Additionally, switches are operated to set initial values of parameters for the computer. A switch for the host computer 13 is turned ON to execute a robot watching program thereby to initiate watching of the robot 1.

Subsequently, the robot 1 is put in the place under the floor and at a suitable location in a manner to be directed to a suitable direction so as to carry out searching for the place under the floor. At this stage, the onboard computer 23 operates according to a searching algorithm if a map basic information for the place under the floor, or otherwise it operates according to commands from the host computer 13 under radio communication. The actuators of the robot 1 are operated by the computer 23 so as to work and run.

The driving motor M5 drives a pair of rollers R1, R2 which are mechanically connected with the caterpillar tread 2 to drive the caterpillar tread 2. Ascending-descending motors M1, M2, M3, M4 form part of a mechanism for controlling the vertical location of the main body 1 a of the robot 1 relative to the caterpillar tread 2, so that main body of the robot 1 can move upwardly or downwardly relative to the ground. A mechanism 4 functions to adjust the distance between the main body 1a of the robot 1 and the caterpillar tread 2. Thus, the motors M1 to M4 and the mechanism 4 control the posture and the height from the ground, of the main body 1a of the robot 1.

The rollers for the opposite caterpillar treads 2 are operatively and electrically connected respectively to encoders 6 for detecting the travel distance and the rotational angle of the robot 1. Additionally, the infrared sensors 7 functions to measure the distance between the structural member such as a sleeper, under the floor. Thus, the robot 1 can run the whole areas under the floor.

During such running of the robot 1, chemical or insecticide for exterminating termite or the like is sprayed from the nozzle mechanism 12 under the action of the electromagnetically controlled pump 11 for supplying the chemical to the nozzle mechanism 12. The nozzle mechanism 12 is arranged to change a spray direction in which the chemical is sprayed. Additionally, the pump 11 is arranged to change the amount and injection speed of the chemical sprayed from the nozzle mechanism 12. Thus, the chemical is sprayed suitably and selectively onto the target structural members under the floor, such as the groundsill and sleeper. After spraying of chemical, the robot 1 returns itself to the original position at which the robot 1 started, and informs the completion of the chemical spraying operation to the host computer 13. Then, an operator makes an operation to store data stored in the memory of the host computer 13 and necessary for the next chemical spraying operation, into a floppy disc. The switches for the computer 23 in the robot 1 and for the motors are turned OFF. Additionally, the switch for the host computer 13 is turned OFF. Finally, the lead battery 8 is removed from the robot 1, thus completing the chemical spraying operation by the robot 1.

Here, the function of the computer 23 will be discussed in detail.

The computer 23 abstracts line and plane from image signals from the CCD camera 10 to obtain data from which the structural members under the floor is estimated. The data are transmitted also to the host computer 13 to produce a map to be confirmed by the operator. At this time, the operator may correct the data, and then the corrected data are again transmitted to the computer 23 on the robot 1. The computer 23 on the robot 1 stores the corrected data in the memory thereof. The computer 23 searches an area which has not yet recognized. If such an area exists, it executes a shortest movement route calculation routine for calculating the shortest movement route of the robot 1 to the area which has not yet confirmed, and move the robot 1 along the shortest movement route. When no area of being not confirmed has been found and the map of the place under the floor has been produced, the computer 23 on the robot 1 executes an operation schedule planning routine for planning the schedule of the chemical spraying operation, so that chemical is sprayed to necessary places in accordance with the operation schedule planning routine. During the execution of this routine, the pump 11 is controlled to obtain the necessary amount and injection speed for chemical to be sprayed or injected from the nozzle mechanism 12. Thus, chemical is sprayed onto the structural members under the floor, such as the groundsills and sleepers while the robot runs around the place under the floor. In case chemical is exhausted, the computer 23 on the robot 1 executes a self-returning routine by which the robot 1 can automatically return to the original or starting position.

Searching the place under the floor may be carried out by the robot 1. During this searching operation, the operation informations are obtained under running of the robot 1 throughout the whole areas under the floor. The informations are transmitted to the host computer 13, in which the informations are monitored on the display of the host computer 13 while the location of the structural members such as the sleepers and groundsills are confirmed by the informations from the CCD camera 10. The place which is a dead area for the CCD camera 12 is confirmed to be approached or not by the infrared sensor 7 or by a corner section detecting device including a photo interrupter and/or a mechanical sensor. The thus confirmed data are stored in the memory of the host computer 1 under key operation of the computer 13 by the operator. Simultaneously, the confirmed data are transmitted also to the computer 23 on the robot 1 through radio communication under the action of the antenna 9. After this searching operation, the robot 1 can automatically return itself to the original or start position. Furthermore, a simulation program may be provided in which data of the structural members such as the groundsills and sleepers are displayed on the display of the host computer 13, and the route, procedure and the like for the chemical spraying operation is simulated under movement of a model of the robot 1 on the display. The operator can correct the route, procedure and the like for the chemical spraying operation by inputting corrections to the simulation program.

The functional relationship between the onboard computer 23 and the host computer 13 will be discussed more in detail.

The onboard computer 23 on the robot 1 and the host computer 13 are electrically connected through radio communication, and therefore a high function can be provided as compared with a conventional system using a radio control manner, thereby communication for a variety of data between the two computers 23, 13 are possible freely at any necessary time. Additionally, even if data are injured or modified by noise or the like during communication between the two computers 23, 13, removal of noise and correction of the data can be made by using an estimating function of the computers. Furthermore, even if the communication between the computers 13, 23 is unexpectedly interrupted, the computer 23 on the robot 1 makes a decision itself and controls the robot 1 so as to return the robot 1 to the original or starting position, thereby previously preventing standstill, runaway or the like of the robot 1 due to interruption of communication between the computers 23, 13.

As shown in FIG. 7, the onboard computer 23 on the robot 1 and the host computer 13 are switched ON to be connected to electric sources. In the host computer 13, a robot condition watching program for watching the condition of the robot 1 is automatically executed while outputting a signal representative of completion of preparation of the host computer 13, to the computer 23 through a RS232 level converter 14 and a wireless connector 15. In the computer 23, first read is made for a mode setting DIP switch 18 connected to an input-output port, and a robot control program for controlling the robot 1 is automatically executed. Additionally, the computer 23 outputs a signal representative of completion of preparation of the robot 1, to the host computer 13 through a RS232C level converter 17 and a wireless connector 16. When the host computer 13 receives the robot preparation completion signal from the computer 23, it executes a main program of the robot condition watching program. When the computer 23 on the robot 1 receives the host computer preparation completion signal from the host computer 13, it executes a main program of the robot control program.

When a moving command by which the robot 1 moves is received from the host computer 13 through the RS232 level converter 17 and the wireless connector 16, the computer (CPU) 23 on the robot 1 further receives an information to judge as to whether the moving command can be executed or not, through a pulse controlling LSI from a ultra red ray (infrared) sensor 21 for searching an obstacle and a power voltage watching OP 22. Upon making such a judgment, the computer 23 outputs a signal through the pulse controlling LSI 24 to ICs for DC motors M5, M6. Thus, the DC motors M5, M6 are supplied through the ICs with electric current to be operated. In order to move the robot 1 forward, the DC motor M5 is rotated in a reverse direction while the DC motor M6 is rotated in a normal direction. In order to move the robot 1 rearward, the DC motor M5 is rotated in the normal direction while the DC motor M6 is rotated in the reverse direction. In order to turn the robot 1 leftward, the DC motors M5, M6 are rotated in the normal direction. In order to turn the robot 1 rightward, the DC motors M5, M6 are rotated in the reverse direction.

Further, the computer 23 receives through the pulse controlling LSI 24 a signal representative of the amount of rotation of the DC motor M5 through an encoder A, and a signal representative of the amount of rotation of the DC motor M6 through an encoder B. When the data of the signals received the computer 23 are normal, the computer 23 outputs a signal representative of error being zero to a LED 19 for display. When the computer 23 receives from the host computer 13 a robot main body ascending and descending command by which the main body 1a of the robot 1 ascends or descends, the computer 23 further receives data from a sensor 20 for vertical movement and then a variety of cancellations are made. Thereafter, signals are output through the respective input buses to ICs for DC motors M1, M2, M3, M4 thereby allowing electric current to be supplied to the DC motors M1, M2, M3, M4. In order to raise only the front section of the main body 1a of the robot 1, the two DC motors M1, M4 are switched ON to be operated. In order to raise only the rear section of the robot main body 1a, the two DC motors M2, M3 are switched ON to be operated. In order to raise the left-side section of the robot main body 1a, the two DC motors M1, M2 are switched ON to be operated. In order to raise the right-side section of the robot main body 1a, the two DC motors M3, M4 are switched ON. In order to raise the whole robot main body 1a horizontally, the four DC motors M1, M2, M3, M4 are rotated. Then, the signal are again received from the vertical movement sensor 20. When the data of the signal is normal, the computer 23 outputs to the LED 19 the signal representative of error being zero.

In case that an abnormality such as a voltage lowering of the lead battery 8 occurs during the chemical spraying operation, this fact is informed to the host computer 13 and the robot 1 is automatically returned to the original position.

The robot 1 may be provided with a termite sensor 25 for detecting a location at which termite exists, in or on the wood structural members such as the groundsill and sleeper. The termite sensor 25 is connected through a manipulator 26 to the main body 1a of the robot 1 and operated under the command from the host computer 13 in case there is a doubtful location for termites. A signal representative of the termite living location is transmitted to the computer which makes a command to carry out the above chemical spraying operation with the robot 1. The following sensors may be used as the termite sensor 25:

(1) A temperature sensor:

Since a location (an objective wood section) of a lumber or wood at which termites are living is high in temperature as compared with other areas in which no termite is living. Accordingly, the temperature difference between the termite living location and the other areas is measured by the temperature sensor in a manner of contact or non-contact with the location thereby to detect the termite living location.

a) In the manner of contact:

The surface temperature for the termite living location is detected by a semiconductor temperature sensor such as a thermistor thermometer or a thermocouple thermometer. Then, the surface temperature difference between the termite living location and the other areas is calculated by the computer, thereby recognizing the termite living location by virtue of the difference.

b) In the manner of non-contact:

The surface temperature difference between the termite living location and the other areas is detected by a photoelectric thermometer which provides a colored image on the display of the computer, in which the termite living location is different in color from the other areas, thus detecting the termite living location.

(2) An acoustic or sound sensor:

Characteristic sound or noise is generated owing to living of termites at the termite living location on or in the wood. The sound is detected in the manner of contact or non-contact. A signal representative of the sound, from the sensor is transmitted to the computer by which the signal is treated to detect the termite living location and data representative of the location is transmitted to the control system of the robot 1.

a) In the manner of contact

A high precision or performance microphone is moved in contact with the surface of the wood to detect the termite living location. There are two examples of this detection: One is arranged such that only the microphone is mounted on a separate small-sized searching robot (not shown) and a signal representative of the termite sound is transmitted to the robot 1 through radio communication; and the other is arranged such that the microphone is mounted on the robot 1 to directly detect the termite sound.

b) In the manner of non-contact

The high precision microphone is mounted on the separate small-sized searching robot or on the robot 1 and moved separate from the termite living location, so that the signal representative of the termite sound is transmitted to the robot. Otherwise, a small-sized sound gathering device may be used in place of the microphone and mounted on the head section of the robot to clearly confirm the termite sound, in which the termite living location will be recognized by making one rotation of the caterpillar tread 2.

(3) A pheromone sensor:

Termites generate characteristic smell of pheromone. Accordingly, the pheromone sensor for detecting the smell of pheromone is mounted on the separate small-sized searching robot or on the robot 1, and is brought into contact with the surface of the wood thereby to detect the termite living location. The signal representative of the smell is transmitted to the robot 1.

It will be understood that the robot 1 may be provided with an optical sensor for detecting lines of luminous paint formed on the wood structural members under the floor of the architectural structure, so that the robot 1 is automatically controlled to run along the lines of luminous paint.

It will be appreciated from the above discussion, that the robot system according to the present invention offers the following advantageous effects:

1) The robot or moving truck can be freely and automatically run on the endless track mechanism while turning horizontally. By virtue of the lift mechanism for the main body of the robot, the distance between the main body and the locomotive section or endless track mechanism so as to change the posture of the main body and the height of the main body relative to the ground. Additionally, the travel distance and rotational angle of the robot can be detected by the encoders which are respectively located inside the right and left side caterpillars, thereby coping with complicated and uneven various configurations of the ground.

2) By virtue of the small-sized CCD camera attached to the main body, the location of the objective wood section of the wood structural members can be accurately confirmed. Additionally, the photo interrupters and mechanical sensors attached at the various portions of the main body can search as to whether there is approach or contact of the main body to the structural members even in the dead area for the CCD camera, thereby grasping the whole condition of the place under the floor.

3) Since the shape and location of the objective wood section is memorized after confirmation of them. Accordingly, at the chemical sprayings at the next time or thereafter, the memorized informations at the preceding time is used thereby accomplishing automatic spraying operation of the chemical without new search of the shape and location of the object.

4) The robot system cannot be manually operated, in which the chemical spraying operation is accomplished securely and effectively within a short time while lowering cost. Additionally, the location to which the chemical is sprayed is accurately limited, and therefore only a small amount of the chemical is used thereby reducing environmental pollution to the house and the circumstance of the house.

5) The robot may be provided with the surface temperature sensor, acoustic sensor or pheromone sensor, serving as the termite sensor. By virtue of such a sensor, the location at which termites are living is immediately and accurately detected, thereby spraying the chemical locally to the location. This suppresses the amount of the sprayed chemical at a necessary minimum level, thus effectively exterminating termites or likes preventing environmental pollution.

What is claimed is:

1. A robot system for spraying chemical for exterminating termite, in a place under a floor of a structure, said robot system comprising:

a moving truck including an endless track mechanism which is able to horizontally turn, a pair of rollers operatively connected to said endless track mechanism and driven by a DC geared motor, and a main body having a tank containing the chemical and a radio circuit for outputting and inputting an electrical signal thorough radio communication;

a lift mechanism operatively connected to said main body to lift said main body relative to said endless track mechanism, said lift mechanism including means for changing a distance between said moving truck main body and endless track mechanism;

a detecting mechanism including an encoder operatively connected to said rollers and arranged to detect a travel distance and a rotational angle of said moving truck;

an automatic control mechanism including an onboard computer mounted on said moving truck main body, a host computer separate from said onboard computer, and a radio modem through which said onboard computer being electrically connected to said host computer, and arranged to automatically control operations of said moving truck;

a CCD camera mounted on said truck main body to confirm the location of the objective wood section in wood structural members under the floor;

a monitoring mechanism for displaying an image of said objective wood section;

corner section detecting means for searching an approach or contact of said moving truck main body to the structural members to find a corner section of the structural member;

means for detecting a distance between said moving truck main body and said objective wood section, and including an infrared sensor; and an automatic operation mechanism including means for memorizing a location and shape of the wood structural members after confirmation of all the wood structural members to which chemical is to be sprayed, and means for accomplishing a next time spray of chemical in accordance with a memorized data derived from a preceding time spray.

2. A robot system as claimed in claim 1, further comprising means for detecting a location at which termite is living, mounted on said moving truck.

3. A robot system as claimed in claim 2, wherein said location detecting means is one selected from the group consisting of a surface temperature sensor for detecting a temperature of a surface of the wood structural members, an acoustic sensor for detecting sound generated by termite, and a pheromone sensor for detecting smell of pheromone.

4. A robot system as claimed in claim 1, further comprising means for forming a line of luminous paint on the wood structural members, an optical sensor for detecting the line of luminous paint, means for automatically operating said robot along the line of luminous paint.

5. A robot system for exterminating termite under the floor of an architectural structure, comprising:

a control system including a host computer;

a moving truck including a main body, an onboard computer which forms part of said control system and mounted on said main body and electrically connected to said host computer through radio communication, first and second endless tracks which are disposed on opposite sides of said main body, first and second drive rollers on which said first and second endless tracks are respectively movably mounted, means for selectively rotating said first and second drive rollers in accordance with a command from said control system, a plurality of vertical position control mechanisms each of which is for controlling a vertical position of a section of the main body, said vertical position control mechanisms being selectively controlled in accordance with a command from said control system;

means for spraying chemical for exterminating termite in accordance with a command from said control system, said means being mounted on said moving truck;

a CCD camera electrically connected to said onboard computer to search the place under the floor in accordance with a command from said control system;

means for controlling said drive rollers and vertical position control mechanisms in accordance with a command from said onboard computer; and means for controlling said drive rollers and vertical position control mechanisms in accordance with a command from said host computer.

* * * * *